United States Patent Office 2,718,530
Patented Sept. 20, 1955

2,718,530

NITRATED AROMATIC HYDROPEROXIDES

Joshua C. Conner, Jr., Wilmington, Del., assignor to Hercules Powder Company, Wilmington, Del., a corporation of Delaware No Drawing. Application October 5, 1950,
Serial No. 188,645

15 Claims. (Cl. 260—610)

This invention relates to a new class of organic hydroperoxides and more particularly to that class of hydroperoxides containing a hydroperoxy group attached to a carbon atom which is adjacent to an aromatic ring containing nitro substituents.

In view of the inability of the organic hydroperoxides of the prior art to serve in certain applications, there has been a need for a new class of organic hydroperoxides which would have a different reactivity than the hydroperoxides of the art and which, therefore, would overcome some of the disadvantaegs of the hydroperoxides which have heretofore been prepared.

Now in accordance with this invention there has been discovered a class of hydroperoxides which has great commercial utility. This class of hydroperoxides is characterized by containing an aromatic hydrocarbon nucleus having attached to the ring thereof at least one nitro group and at least one member of the group consisting of $\alpha,\alpha$-dialkyl-$\alpha$-hydroperoxymethyl and $\alpha$-alkyl-$\alpha$-hydroperoxymethyl groups. The hydroperoxides of this invention may be prepared by passing an oxygen-containing gas under noncatalytic conditions through the corresponding nitrated hydrocarbon in liquid phase. For example, p-nitrocumene can be oxidized to $\alpha,\alpha$-dimethyl-p-nitrobenzyl hydroperoxide by passing oxygen through this compound in the liquid phase at a temperature of, for example, between about 20° C. and 200° C. in the presence of an aqueous solution of a water-soluble alkali. The hydroperoxides of this invention are particularly useful in that they may be decomposed to produce nitrophenols and either aliphatic ketones or aliphatic aldehydes simply, efficiently, economically, and simultaneously. The decomposition process is straightforward and is capable of producing nitrophenols of definite structure while at the same time producing either aliphatic ketones or aliphatic aldehydes as valuable products. This is in contrast to previous processes for preparing nitrophenols.

In carrying out the decomposition of the hydroperoxides of this invention, the hydroperoxide, such as $\alpha,\alpha$-dimethyl-p-nitrobenzyl hydroperoxide, which may be dissolved in a solvent such as cumene or benzene, is contacted with a catalyst such as an acid-treated bentonite at a temperature of about 20° C. until the hydroperoxide is completely decomposed to the nitrophenol. The nitrophenol produced is p-nitrophenol and the other product of the decomposition reaction is acetone which is recovered in suitable condensation units which are part of the apparatus used. The following examples constitute specific illustrations of the products of this invention, methods for preparing these products and processes in which the products of the invention may be utilized to prepare other useful products. All parts are parts by weight.

Example 1

Into a glass reaction vessel equipped with a stirrer, a reflux condenser, and an oxygen-inlet tube were charged 100 parts of p-nitrocumene ($n_D^{20}$=1.5321; percent N=7.93), 3.1 parts of an $\alpha,\alpha$-dimethylbenzyl hydroperoxide product containing 97.6% of the hydroperoxide and 200 parts of an 0.5% aqeuous sodium hydroxide solution. The reaction mixture was heated to 90° C. and oxygen was passed through the mixture at a rate of 100 cc. per minute. During the oxidation, samples were withdrawn at regular intervals for determination of hydroperoxide content, the determination being carried out by adding the sample to an acidified potassium iodide solution and noting the amount of iodine liberated. The log of the run was as follows:

| Time, Hrs. | $n_D^{20}$ | Percent $a,a$-Dimethyl-p-Nitrobenzyl Hydroperoxide |
|---|---|---|
| 5.47 | 1.5323 | 1.11 |
| 21.7 | 1.5339 | 8.01 |
| 29.3 | 1.5345 | 10.1 |
| 45.8 | 1.5360 | 14.3 |
| 53.4 | 1.5367 | 15.4 |

Upon completion of the oxidation there was recovered 75 parts of a bright yellow product which contained $\alpha,\alpha$-dimethyl-p-nitrobenzyl hydroperoxide as the principal oxygenated material. Material recovery from the oxidation, including samples withdrawn for analysis, was about 93%.

Example 2

The procedure of Example 1 was duplicated with the exception that there was used 300 parts of p-nitrocumene (percent N=8.65), 39,3 parts of an $\alpha,\alpha$-dimethyl-p-nitrobenzyl hydroperoxide product containing 22.1% of the hydroperoxide and 200 parts of an 0.5% aqeuous sodium hydroxide solution. The log of the run was as follows:

| Time, Hrs. | $n_D^{20}$ | Percent $a,a$-Dimethyl-p-Nitrobenzyl Hydroperoxide |
|---|---|---|
| 3.6 | 1.5362 | 3.34 |
| 20.3 | 1.5378 | 10.9 |
| 28.0 | 1.5383 | 14.3 |
| 44.7 | 1.5400 | 23.5 |
| 50.7 | 1.5410 | 26.8 |

Upon completion of the oxidation there was recovered 322 parts of a liquid product containing $\alpha,\alpha$-dimethyl-p-nitrobenzyl hydroperoxide as the principal oxygenated material. Material recovery, including samples withdrawn for analysis, was about 97%.

Example 3

In this example, nitro-p-cymene (1-isopropyl-3-nitro-4-methylbenzene) in the amount of 400 parts was oxidized under anhydrous conditions at a temperature of 95° C. in the presence of 4.0 parts of calcium hydroxide and 40 parts of a nitro-$\alpha,\alpha$-dimethyl-p-methylbenzyl hydroperoxide product containing 10% of the hydroperoxide by passing oxygen through the mixture at a rate of 200 cc. per minute. Upon completion of the oxidation there was obtained 448 parts of a yellow liquid which contained 15.8% 3-nitro-4-methyl-$\alpha,\alpha$-dimethylbenzyl hydroperoxide.

Example 4

In this example, mononitrodiisopropylbenzene (2-nitro-1,4-diisopropylbenzene) in the amount of 500 parts was oxidized under anhydrous conditions at a temperature of 100° C. in the presence of 5 parts of calcium hydroxide and 50 parts of $\alpha,\alpha$-dimethylbenzyl hydroperoxide product containing 10% of the hydroperoxide by passing oxygen through the mixture at a rate of 0.15 cu.

ft./min. After six hours it was found that the yellow reaction product contained 27.7% of 2-nitro-4-isopropyl-α,α-dimethylbenzyl hydroperoxide.

*Example 5*

In this example, p-nitroethylbenzene in the amount of 500 parts was oxidized under anhydrous conditions at a temperature of 95° C. in the presence of 0.5 part of calcium hydroxide, and the reaction was initiated with one part of α,α-dimethylbenzyl hydroperoxide. Following the procedure of Example 3, oxygen was passed through the reaction mixture at a rate of 52 cc. per minute. After 8 days there was obtained 102 parts of a yellow oxidation product which contained 10% p-nitro-α-methylbenzyl hydroperoxide.

*Example 6*

Following the general procedure of Example 1, 400 parts of 2-nitro-1,4-diisopropylbenzene was oxidized in the presence of 2 parts of an α,α,α',α'-tetramethyl-p-xylylene dihydroperoxide product containing 50% of the hydroperoxide, and 50 parts of a 2% aqueous sodium carbonate solution. The reaction mixture was heated to 110° C. and air was passed through the mixture under a pressure of 80 p. s. i. for 60 hours. Upon completion of the oxidation, there was recovered 80 parts of a bright yellow product which was identified as 2-nitro-α,α,α',α'-tetramethyl-p-xylylene dihydroperoxide.

*Example 7*

Following the procedure of Example 6, 200 parts of 2,4-dinitroisopropylbenzene was oxidized for 48 hours at 100° C. in the presence of 50 parts of a 1% sodium carbonate solution. The oxidation was initiated with one part of 2,4-dinitro-α,α-dimethylbenzyl hydroperoxide. The yellow-orange oxidation product contained 35% of 2,4-dinitro-α,α-dimethylbenzyl hydroperoxide.

*Example 8*

In this example, p-nitro-α,α-dimethylbenzyl hydroperoxide was decomposed under anhydrous conditions. To a reaction vessel equipped with a stirrer, a condenser, and an inlet for addition of the hydroperoxide there was charged 50 parts of the 26.8% hydroperoxide product obtained in Example 2 over a 10-minute period to an agitated slurry of 0.6 part of an acid-treated bentonite in 8 parts of benzene. The temperature was regulated to keep the benzene at reflux. Ten minutes after the addition of the hydroperoxide was completed an active oxygen analysis of the reaction product, obtained by adding a sample of the reaction mixture to acidified potassium iodide, indicated that the hydroperoxide had been completely decomposed. The acetone and benzene were then removed by distillation at atmospheric pressure and a vapor temperature of 74° C., 12.1 parts of the distillate containing 30.9% acetone. This quantity corresponded to a 95.6% yield of acetone based on the hydroperoxide originally present. The residue was extracted with 5% aqueous sodium hydroxide solution until a negative test for phenolic material was obtained. The aqueous extracts were combined, acidified with hydrochloric acid and extracted with ether until the aqueous residue gave a negative test for phenol. Evaporation of the ether extract yielded 10.1 parts of red crystalline p-nitrophenol, which corresponded to a yield of 98% based upon the hydroperoxide originally present. Analysis of the product showed a nitrogen content of 9.53% which was 95.3% of the theoretical.

*Example 9*

In this example, m-nitro-α,α-dimethyl-p-methylbenzyl hydroperoxide was decomposed in an aqueous system. Fifty parts of an m-nitro-α,α-dimethyl-p-methylbenzyl hydroperoxide product containing 75% of the hydroperoxide was added to 50 parts of 10% aqueous sulfuric acid solution and rapidly stirred at 100° C. After 70 minutes the hydroperoxide was completely decomposed. The reaction mixture was neutralized with 16 parts of sodium hydroxide in pellet form and distilled until 25 parts of distillate was obtained. Analysis of the distillate by means of the well known 2,4-dinitrophenylhydrazine method showed a 92% yield of acetone based on the quantity of hydroperozide originally present. The residue was extracted with two portions of ether, acidified with concentrated hydrochloric acid and then further extracted with three more portions of ether. The combined ether extracts when evaporated to dryness gave a yield of yellow crystalline m-nitro-p-cresol, which was 75% of the theoretical based on the hydroperoxide originally present.

The examples have set forth nitrocumene, nitro-p-cymene, dinitrocumene, nitroethylbenzene, and nitro diisopropylbenzene as compounds which may be oxidized to produce the hydroperoxides of this invention and it will be realized that the hydroperoxides of this invention may be prepared by the oxidation of any organic compound containing an aromatic hydrocarbon nucleus having attached to the ring thereof at least one nitro group and at least one alkyl group having at least two carbon atoms. The basic hydrocarbons corresponding to the nitro derivatives which are oxidized in accordance with this invention may be illustrated by such compounds as cumene, p-cymene, p-diisopropylbenzene, isobutylbenzene, secondary butylbenzene, tertiary butylisopropylbenzene, p-ethylisopropylbenzene, α- or β-isopropylnaphthalene, ethylbenzene, n-propylbenzene, n-butylbenzene, and n-amylbenzene. These compounds all contain either a secondary or tertiary carbon atom adjacent to the aromatic nucleus. The aromatic nucleus need not be derived from benzene, as is the case of cumene, since compounds containing aromatic nuclei, such as those derived from naphthalene, anthracene, and phenanthrene may also be oxidized in accordance with this invention to produce the corresponding hydroperoxides. Other alkyl groups which may be attached to the aromatic nucleus are the methyl, ethyl, propyl, isopropyl, butyl, isobutyl, secondary butyl, tertiary butyl, amyl and the like. When more than one alkyl group is attached to the aromatic nucleus these alkyl groups may be either the same or different and may be any of the alkyl groups mentioned above. The alkyl groups attached to the α-carbon atom of the compound (i. e., the carbon atom to which the hydroperoxy group is attached) also may be the same or different and may be any of the above-named alkyl groups.

The compounds which are oxidized in accordance with this invention are those hydrocarbons discussed above which contain one or more nitro substituents attached to the aromatic nucleus. When the aromatic nucleus is phenyl, the number of nitro substituents generally will not exceed three and one or two such substituents are preferable. The same holds true for nuclei such as naphthyl, anthryl, and phenanthryl, though a greater number of nitro substituents are possible in such nuclei due to the greater number of free positions. Specific compounds which may be oxidized to corresponding hydroperoxides are p-nitrocumene, 2-nitro-1-methyl-4-isopropylbenzene, 3-nitro-1-methyl-4-isopropylbenzene, m-nitrocumene, 2,4-dinitroisopropylbenzene, 2,4,6-trinitroisopropylbenzene, 4-nitro-1-isopropylnaphthalene, p-nitroethylbenzene and 2-nitro-1,4-diisopropylbenzene. Other compounds which may also be oxidized to produce the hydroperoxides of this invention are nitrodiisopropylbenzene, nitrotriisopropylbenzene and similar compounds having more than one nitro group and more than one alkyl group attached to the ring of the hydrocarbon nucleus. In the case of those compounds having more than one alkyl group attached to the hydrocarbon nucleus, oxidation of these compounds in accordance with this invention for an extended period leads to the formation of polyhydroperoxides such as the dihydroperoxides and the trihydroperoxides. Thus, when mononitrodiisopropylbenzene is oxidized for an extended period of time there is produced the dihydroperoxide corresponding to this compound, the hydroperoxy groups being attached to the tertiary carbon atoms of the isopropyl groups. In the case of the extended oxidation of a compound such as 1-nitro-2-ethyl-4-isopropylbenzene, there results the dihydroperoxide of this compound with the one hydroperoxy group attached to the tertiary carbon atom of the isopropyl group and the other hydroperoxy group attached to the secondary carbon atom of the ethyl group.

The process for producing the hydroperoxides of this invention essentially comprises passing an oxygen-containing gas under noncatalytic conditions through the nitro-substituted aromatic hydrocarbons discussed above, the oxidation being carried out in the liquid phase. The liquid phase may be either substantially homogeneous, as when anhydrous conditions are used and the compound being oxidized is the principal component of the reaction mixture, or it may be heterogeneous, as when a separate aqueous phase, which may be either ordinary water or an aqueous alkaline solution, is included.

The temperature during oxidation will be in excess of 20° C. Using anhydrous conditions, the temperature range is preferably from about 50° to about 100° C., more desirably from about 65° to about 90° C. Particularly satisfactory is the range between about 75° and about 90° C. When using an aqueous phase, the temperature is preferably between about 25° and about 95° C., desirably between about 50° and about 90° C. When pressure is applied to the oxidation system, however, the temperature may be increased considerably, for example, up to about 200° C. Under anhydrous conditions using pressure the preferable range is from about 50° to about 150° C., and when using an aqueous phase and pressure, it is most desirable to operate between about 95° and about 200° C.

The pressures which can be utilized during those oxidations carried out at greater than atmospheric pressure are limited only by equipment design. From a practical standpoint, pressures from atmospheric up to about 500 p. s. i. are feasible. Pressures between about 30 and about 500 p. s. i. are advantageous, and pressures of about 50 to about 200 p. s. i. are preferable.

It is preferable that the oxidation be effected using an alkaline stabilizing agent. The examples have shown the use of sodium hydroxide and calcium hydroxide, but in general there may be used the alkali metal hydroxides, such as the hydroxides of sodium, potassium, lithium, and the like; alkaline earth metal oxides and hydroxides, such as calcium hydroxide, barium hydroxide, strontium hydroxide, calcium oxide, and barium oxide. Inorganic carbonates and bicarbonates, such as sodium carbonate and bicarbonate, and alkali metal salts of weak organic acids may also be employed. Strong organic bases such as trialkylarylammonium hydroxides, for example, trimethylbenzylammonium hydroxide, may also be used. Ammonia also is operable. These alkaline stabilizing agents may be used either in the form of an aqueous solution or as part of an anhydrous oxidation reaction mixture. When used under anhydrous conditions, the alkali preferably is in finely-divided form, and the amount may be varied from about 0.05 to about 10% by weight based on the nitro-substituted aromatic organic compound being oxidized. A preferable range on this basis is from about 1 to about 5%, and a most desirable range is from about 1 to about 3%. When used in the form of an aqueous solution, the solution will contain between about 0.01 and about 35% by weight of the alkali. Preferably, the concentration of alkali in solution will be between about 0.01 and about 2%, and a highly desirable range is from about 0.5 to about 1.0% by weight. The ratio of the quantity of aqueous alkaline solution present in the reaction mixture to the amount of compound subjected to oxidation may be varied within wide limits from about 1:50 to about 10:1. It is preferable, however, to utilize a ratio within the range of from about 1:10 to about 1:3.

Another of the features of this invention is the step of carrying out the oxidation in the presence of a peroxidic free radical oxidation initiator. Representative of such an initiator is an α,α-dialkylarylmethyl hydroperoxide, for example, α,α-dimethylbenzyl hydroperoxide. In general, there may be used any peroxidic substance which is capable of initiating a free radical oxidation chain under the conditions utilized. There may be used, in other words, any organic peroxide, hydroperoxide, or compound capable of decomposing to form organic free radicals. Illustrative of such materials are acetyl peroxide, benzoyl peroxide, triphenylmethyl peroxide, tertiary butyl hydroperoxide, tetralin hydroperoxide and naphthene hydroperoxides. These peroxidic materials include the acyl, aroyl, dialkyl, and diaralkyl peroxides and the alkyl, aralkyl, cycloalkyl, and cycloalkenyl hydroperoxides. Other free radical initiators, such as hexaphenyl ethane, which are converted into peroxidic materials during the oxidation process of this invention also are operable. On the basis of the pure peroxidic material, the concentration of this material based on the compound being oxidized may be varied from about 0.01 to about 20%, a preferable range being from about 0.1 to about 10%. A particularly applicable amount is about 3%. When initiating the oxidation of the nitro-substituted aromatic organic compounds of this invention it may be desirable to use as the initiator the hydroperoxide obtained by oxidation of the same compound. For example, in the oxidation of p-nitrocumene it is preferable to initiate the reaction by the addition of α,α-dimethyl-p-nitrobenzyl hydroperoxide.

The examples have set forth the use of oxygen as the oxygen-containing gas, but air may be utilized, and also operable are mixtures of oxygen with nitrogen or other inert gases. The rate of input of the oxygen-containing gas should be such that at least the theoretical amount of oxygen is supplied. By theoretical amount is meant that amount of oxygen necessary to convert the nitro-substituted aromatic organic compound completely to the corresponding hydroperoxide. Actually, it is preferable to use about twice the theoretical amount of oxygen, and under such conditions the amount of oxygen in the exit gas will be about one-half of that in the input gas. The rate of input will depend upon the temperature and pressure utilized during the oxidation. Using p-nitrocumene as an example, it is possible to determine the rate of oxidation of this compound at any particular temperature and pressure and, knowing the rate of oxidation, it then is possible to calculate the amount of oxygen necessary to get the required rate. This amount of oxygen is the theoretical amount. In general, the rate of input at atmospheric pressure will be from about 1 to about 100 liters/hr./kg. of the compound being oxidized, and under pressures of, for example, 50 to 200 p. s. i., will be from about 50 to about 350 liters/hr./kg. of the compound.

The oxidation process of this invention may be carried out either batchwise or continuously. It affords a means of obtaining high yields of the nitro-substituted hydroperoxides previously described. These hydroperoxides are extremely useful in that they may be decomposed to the corresponding nitro-substituted phenolic compounds. For example, p-nitrophenol may be prepared from α,α-dimethyl-p-nitrobenzyl hydroperoxide by action of an acid condensation catalyst such as sulfuric acid or an acid clay on the hydroperoxide. The reaction is one of decomposition of the hydroperoxide and results in the formation of p-nitrophenol and acetone. Due to the fact that the hydroperoxides of this invention contain their substituent groups in definite relationship to each other, it is possible through decomposition of the hydroperoxides to obtain nitrophenols which contain the phenolic and nitro substituents in definite relationship to each other. The novel hydroperoxides of this invention therefore afford a means of obtaining certain nitrophenols which have in the past always been prepared in admixture with other isomers.

In carrying out the decomposition process of this invention, several different modifications of the nitrated hydroperoxides may be used. The hydroperoxide may be utilized, for example, either in the form of the pure hydroperoxide or in the form of a crude reaction mixture obtained by the oxidation. To obtain the hydroperoxide in a concentrated form, the crude oxidation reaction mixture may be stripped of unreacted nitrated hydrocarbon by distillation at pressures of about 1 to about 10 mm. of mercury/sq. cm. Other methods which may be used to concentrate the hydroperoxides involve solvent extraction, and precipitation with a concentrated aqueous solution (25–40%) of sodium hydroxide.

The hydroperoxides of this invention, therefore, may be decomposed when in the pure state and also when contained in mixtures with varying amounts of other organic materials. Any of the hydroperoxide materials may be dissolved in a suitable organic solvent which is inert to any of the reactants, products or reaction conditions involved in the process of this invention. The solvent should be nonreactive under the conditions of reaction to the hydroperoxide, the catalyst and any of the phenolic or carbonylic reaction products obtained by the decomposition. Exemplary of such solvents are the aliphatic, cycloaliphatic, and aromatic hydrocarbons, alcohols, ketones, ethers, esters, and liquid chlorinated hydrocarbons. Exemplary of these solvents are pentane, hexane, benzene, toluene, xylene, cumene, chloroform, carbon tetrachloride, ethanol, acetone, methyl acetate, diethyl ether, and the like. In addition, various acidic solvents such as glacial acetic acid which may exert some catalytic activity may be used. When used, the amount of other catalyst may be reduced. The concentration of the solvent and the hydroperoxide in the solution is limited only by the reactivity of the hydroperoxide during the decomposition, the effectiveness of the catalyst, and the temperature and pressure used.

The decomposition reaction also may be carried out in the vapor phase. The hydroperoxide may be vaporized and brought into intimate contact with the catalyst and the decomposition will readily occur. The vapor process is advantageous in that the nitrophenol produced can be vaporized immediately from the reaction zone.

The decomposition reaction of this invention may be carried out either under substantially anhydrous conditions, or in the presence of an aqueous phase. There may be used in the process any catalyst capable of decomposing the nitrated hydroperoxide to the corresponding nitrophenol. Generally illustrative of such catalysts are those materials known as condensation catalysts, particularly the acidic condensation catalysts. The examples have shown the use of an acid-treated bentonite and sulfuric acid but also found operable in the process are catalysts such as anhydrous ferric chloride, boron trifluoride, montmorillonite, kaolinite, vermiculite, silica gel, kaolin, fuller's earth, diatomaceous earth, halloysite, trichloroacetic acid, picric acid, dichloroacetic acid, chloroacetic acid; sulfonic acids such as benzenesulfonic acid, p-toluene-sulfonic acid, and sulfonated phenol-formaldehyde and styrene-divinylbenzene polymers; cracking catalysts such as phosphoric acid-on-alumina; and various phosphorous compounds such as phosphorus trichloride, phosphorus pentachloride, and phosphorus oxychloride. All of these catalysts are illustrative of the class of catalysts known as acidic condensation catalysts. Included within this class are various materials such as the silicates, silica gel, kieselguhr, hydrosilicates, and bauxite which are surface-active substances composed of basic compounds but which have sufficient acidic surface activity to render them operable in the process. Also included are the Friedel-Crafts catalysts such as aluminum chloride, ferric chloride, boron trifluoride, zinc chloride, stannic chloride, and magnesium chloride, all of which may be supported on a carrier, which itself may have catalytic activity; other supported catalysts such as phosphoric acid on fullers' earth or silica; inorganic acids, for example, hydrogen chloride or sulfuric acid; and organic acids, for example, acetic acid, propionic acid, trinitroacetic acid, mononitroacetic acid, picric acid, benzenesulfonic acid, and p-toluenesulfonic acid.

The concentration of the catalyst based on the hydroperoxide will depend on the reactivity of the catalyst, the temperature of reaction, the desired reaction time and the mode of operation. In a batch decomposition process, the concentration generally may be from about 0.01% to about 200%. A preferable catalyst concentration on this basis is from about 1% to about 20%, and a particularly applicable amount in most instances is about 5%. In the case of those catalysts wherein it is possible to calculate their molar concentrations relative to the hydroperoxide, the range of catalyst concentration may be expressed as from about 0.01 mole per cent to about 200 mole per cent based on the hydroperoxide, a preferable range on this basis being from about 1% to about 10%. In a continuous operation the ratio of catalyst to hydroperoxide at any particular instant may be as high as 100 to 1, depending upon the design of the reactor, the size of the catalyst particles, and the rate of flow of the hydroperoxide over the catalyst bed.

When the decomposition is carried out under conditions involving an aqueous phase, a water-soluble acid is preferably used. Both inorganic and organic water-soluble acids are operable. Exemplary of the inorganic acids are hydrochloric, sulfuric and phosphoric acids and the organic acids may be exemplified by the organic sulfonic acids such as p-toluenesulfonic acid. It is desirable that the concentration of the acid in the aqueous phase be at least 20% by weight, a preferable range on this basis being from 20 to about 65%. Particularly applicable is a concentration range from 20 to about 50%. Concentrations of acid below 20% by weight produce lower yields and require appreciably longer reaction times.

The temperature may be varied, depending principally upon the activity of the catalyst. In general, the decomposition reaction may be effected over a temperature range of about −80° C. to about 400° C. When using anhydrous conditions, a preferable range is about 0° C. to about 200° C. When using an aqueous phase, a preferable range is about 15° C. to about 100° C.

The examples have shown the decomposition reaction as being carried out at atmospheric pressure. The reaction, however, may be effected under reduced pressure and it is obvious that it also may be carried out under pressures greater than atmospheric. A broad range of pressure conditions is possible but from a practical standpoint the reaction preferably is carried out either at atmospheric or slightly less than atmospheric pressure.

The process of decomposing the products of this invention to nitrophenols has many outstanding advantages over previous processes for the preparation of nitrophenols. The reaction is adapted to the use of inexpensive, simple equipment and the life of the equipment is long, due to the lack of corrosive reagents. Due to the fact that it is possible in the hydroperoxides of this invention to have the nitro substituents in definite relationship to each other, it is possible through decomposition of the hydroperoxides to obtain nitrated phenols which also contain the phenolic and nitro substituents in definite relationship to each other. This is a definite advantage over prior processes in which a mixture of isomers always was obtained. A further advantage of the decomposition process is that it may be combined with the oxidation process for preparation of the hydroperoxides in such a manner that a continuous process may be carried out. One of the overall processes involved in this invention comprises the alkylation of benzene with propylene to obtain cumene, nitration of cumene to obtain p-nitrocumene, oxidation of the p-nitrocumene to obtain α,α- dimethyl-p-nitrobenzyl hydroperoxide, decomposition of this hydroperoxide to obtain p-nitrophenol and acetone as products, separation of the p-nitrophenol and acetone from the reaction mixture and recycle of any p-nitrocumene remaining after the decomposition step to the oxidation system after first removing any contaminating p-nitrophenol, the latter being an inhibitor for the oxidation. Preferably, it is desirable to remove by distillation, for example, the major portion of unreacted p-nitrocumene immediately following the oxidation step.

The decomposition of the hydroperoxides of this invention represents a more economical and efficient means for obtaining nitrophenols. Due to the simple nature of the process, it will be found particularly applicable to small scale installations and will not require the vast outlay of capital and equipment required by previous processes.

In addition, the hydroperoxides of this invention may be easily converted to the corresponding acetophenone. Thus, when $\alpha,\alpha$-dimethyl-p-nitrobenzyl hydroperoxide is treated with a ferrous salt such as $FeSO_4$ there is produced p-nitroacetophenone. On the other hand, if the hydroperoxides of this invention are treated with hydrogen or an inorganic reducing salt such as sodium sulfide, sodium sulfite, etc., the hydroperoxide is reduced to the corresponding alcohol. For example, $\alpha,\alpha$-dimethyl-p-nitrobenzyl hydroperoxide is reduced to $\alpha,\alpha$-dimethyl-p-nitrobenzyl alcohol.

The hydroperoxides of this invention are also very useful as catalysts in both the emulsion and homogeneous polymerization of unsaturated compounds such as styrene and butadiene.

What I claim and desire to protect by Letters Patent is:

1. As a new product, a hydroperoxide containing an aromatic hydrocarbon nucleus having attached to the ring thereof at least one nitro group and at least one member of the group consisting of $\alpha,\alpha$-dialkyl-$\alpha$-hydroperoxymethyl and $\alpha$-alkyl-$\alpha$-hydroperoxymethyl groups.

2. As a new product, a hydroperoxide containing an aromatic hydrocarbon nucleus having attached to the ring thereof one nitro group and at least one $\alpha,\alpha$-dialkyl-$\alpha$-hydroperoxymethyl group.

3. As a new product, a hydroperoxide containing an aromatic hydrocarbon nucleus having attached to the ring thereof one nitro group and two $\alpha,\alpha$-dimethyl-$\alpha$-hydroperoxymethyl groups.

4. As a new product, a hydroperoxide containing an aromatic hydrocarbon nucleus having attached to the ring thereof one nitro group and one $\alpha,\alpha$-dialkyl-$\alpha$-hydroperoxymethyl group.

5. As a new product, a nitro-$\alpha,\alpha$-dimethylbenzyl hydroperoxide.

6. As a new product, p-nitro-$\alpha,\alpha$-dimethylbenzyl hydroperoxide.

7. As a new product, a nitro-$\alpha,\alpha$-dimethyl-p-methylbenzyl hydroperoxide.

8. As a new product, a hydroperoxide containing an aromatic hydrocarbon nucleus having attached to the ring thereof one nitro group and one $\alpha$-alkyl-$\alpha$-hydroperoxymethyl group.

9. As a new product, a nitro-$\alpha$-methylbenzyl hydroperoxide.

10. As a new product, a hydroperoxide containing an aromatic hydrocarbon nucleus having attached to the ring thereof two nitro groups and one $\alpha,\alpha$-dialkyl-$\alpha$-hydroperoxymethyl group.

11. As a new product, a dinitro-$\alpha,\alpha$-dimethylbenzyl hydroperoxide.

12. As a new product, 2-nitro-$\alpha,\alpha,\alpha',\alpha'$-tetramethyl-p-xylylene dihydroperoxide.

13. As a new product, 3-nitro-4-methyl-$\alpha,\alpha$-dimethylbenzyl hydroperoxide.

14. As a new product, p-nitro-$\alpha$-methylbenzyl hydroperoxide.

15. As a new product, 2,4-dinitro-$\alpha,\alpha$-dimethylbenzyl hydroperoxide.

References Cited in the file of this patent

UNITED STATES PATENTS

| | | |
|---|---|---|
| 2,092,322 | Moser | Sept. 7, 1937 |
| 2,192,197 | Mills et al. | Mar. 5, 1940 |
| 2,311,283 | Roblin, Jr. | Feb. 16, 1943 |
| 2,403,772 | Vaughn et al. | July 9, 1946 |
| 2,455,322 | Teeters et al. | Nov. 30, 1948 |
| 2,527,640 | Lorand et al. | Oct. 31, 1950 |

FOREIGN PATENTS

| | | |
|---|---|---|
| 96,855 | Germany | Mar. 25, 1898 |

OTHER REFERENCES

Hock et al.: Berichte der Deut. Gesell., vol. 77B, pp. 257–264 (1944).

Bartlett et al.: Jour. Amer. Chem. Soc., vol. 72, pp. 3095–3099 (5 pages, July 1950).